(12) United States Patent
Xu et al.

(10) Patent No.: US 12,483,433 B2
(45) Date of Patent: Nov. 25, 2025

(54) DATA STORAGE DEVICE, MOBILE OBJECT, AND STORAGE MEDIUM STORING DATA DELETION PROGRAM

(71) Applicant: DENSO CORPORATION, Kariya (JP)

(72) Inventors: Xin Xu, Kariya (JP); Hayato Sakamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/770,411

(22) Filed: Jul. 11, 2024

(65) Prior Publication Data

US 2024/0361935 A1    Oct. 31, 2024

Related U.S. Application Data

(63) Continuation of application No. PCT/JP2023/000601, filed on Jan. 12, 2023.

(30) Foreign Application Priority Data

Jan. 13, 2022    (JP) .................................. 2022-003613

(51) Int. Cl.
*H04L 9/00* (2022.01)
*G06F 11/14* (2006.01)
*H04L 9/32* (2006.01)

(52) U.S. Cl.
CPC ............ *H04L 9/50* (2022.05); *G06F 11/1469* (2013.01); *H04L 9/3236* (2013.01); *H04L 2209/84* (2013.01)

(58) Field of Classification Search
None
See application file for complete search history.

(56) References Cited

U.S. PATENT DOCUMENTS

| 2020/0026619 A1 | 1/2020 | Kaji et al. |
| 2020/0296559 A1 | 9/2020 | Ahmed et al. |
| 2021/0012591 A1 | 1/2021 | Mitani et al. |

FOREIGN PATENT DOCUMENTS

EP    3672196 A    6/2020

OTHER PUBLICATIONS

Alam Md Swawibe Ul et al. "Securing Vehicle ECU Communications and Stored Data." ICC 2019-2019 IEEE. International Conference on Communications (ICC), IEEE, May 20, 2019 (May 20, 2019), pp. 1-6, XP033582488,. DOI: 10.1109/ICC.2019.8762043 [retrieved on Jul. 12, 2019].

*Primary Examiner* — Eddy Cheung
(74) *Attorney, Agent, or Firm* — Maschoff Brennan

(57) ABSTRACT

An in-vehicle ECU deletes part of data in a blockchain, when the data stored in the blockchain accumulates to have a bigger data size. Then, the in-vehicle ECU, upon having the part of data deleted from the blockchain, acquires a lowest block number in the blockchain, and stores and updates the number in a secure world. Therefore, while the stored lowest block number is updated when data deletion is a legitimate one, the data deletion caused by unauthorized tampering will not lead to an update of the stored lowest block number.

10 Claims, 4 Drawing Sheets

DATA STORAGE DEVICE, MOBILE OBJECT, AND STORAGE MEDIUM STORING DATA DELETION PROGRAM

CROSS REFERENCE TO RELATED APPLICATIONS

This application is a continuation application of International Patent Application No. PCT/JP2023/000601 filed on Jan. 12, 2023, which designated the U.S. and claims the benefit of priority from Japanese Patent Application No. 2022-003613 filed on Jan. 13, 2022. The entire disclosure of all of the above application is incorporated herein by reference.

TECHNICAL FIELD

The present disclosure relates to a data storage device, a mobile object, and a storage medium storing a data deletion program.

BACKGROUND ART

In recent years, the importance of data acquired by a mobile object such as vehicles has been increasing. Therefore, there is a need for a device that can store data acquired by a moving object such as a vehicle while ensuring reliability.

There has been known data storage device in which an in-vehicle ECU stores data acquired in a vehicle using a blockchain. However, as acquired data is accumulated in a vehicle over a long period of time (for example, over a year), the data size and/or blockchain size increase.

On the other hand, the storage capacity installed in a vehicle is not sufficient to store large amounts of data. Further, external storage for a vehicle such as SD memory cards requires reliability and is thus expensive. For such reason, it is difficult for a vehicle to store all acquired data using a blockchain.

Further, there has been also known a history management method for backing up history information of one's own vehicle to another vehicle or a server on a cloud and restoring it. However, such history management method does not work when the own vehicle is unable to send and receive data to and from the cloud or other vehicles.

SUMMARY

A data storage device according to one aspect of the present disclosure is a data storage device that stores acquired data using a blockchain, and includes: a deletion unit that is configured to delete unnecessary data from among data included in the blockchain; and a lowest number storage processing unit that is configured to acquire a lowest block number of the blockchain and stores the acquired lowest block number in a storage area when the data is deleted by the deletion unit.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
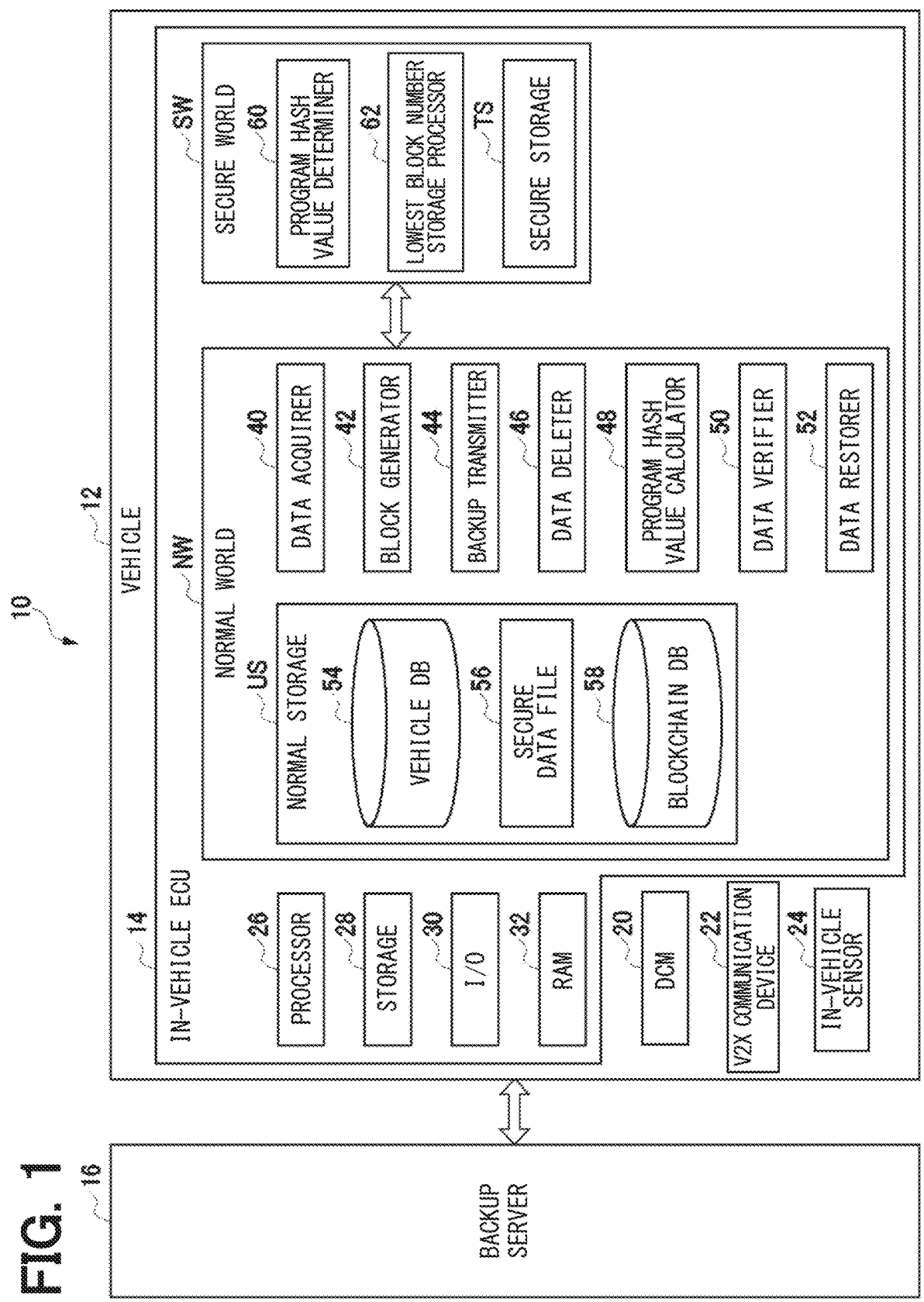
FIG. 1 is a functional block diagram showing an electric configuration of a data storage system according to an embodiment.

Next, a relevant technology will be described below only for understanding the following embodiment. As described above, considering that the storage capacity installed in a vehicle is limited, it is conceivable to delete some of the data included in the blockchain. However, in order to maintain the reliability of data deletion, it is necessary to determine whether the deletion of data included in the blockchain is legitimate deletion or malicious and unauthorized tampering.

In view of the above-described background, it is an objective of the present disclosure to provide a data storage device, a mobile device, and a data deletion program that is capable of determining whether deletion of data included in a blockchain is legitimate deletion or unauthorized tampering.

A data storage device according to a first aspect of the present disclosure is a data storage device that stores acquired data using a blockchain, and includes:
  a deletion unit that is configured to delete unnecessary data from among data included in the blockchain; and
  a lowest number storage processing unit that is configured to acquire a lowest block number of the blockchain and stores the acquired lowest block number in a storage area when the data is deleted by the deletion unit.

With such configuration, when data included in a blockchain is deleted, the lowest block number of the blockchain is acquired and stored in the storage area. Therefore, when the data deletion is legitimately made, the stored lowest block number is updated. On the other hand, when the deletion of data is unauthorized tampering, the stored lowest block number will not be updated. According to the above, it is possible to determine whether the deletion of data included in the blockchain is legitimate deletion or unauthorized tampering.

A mobile object according to a second aspect of the present disclosure includes the data storage device described above.

A non-transitory, computer readable, storage medium according to a third aspect of the present disclosure stores a data deletion program for deleting data constituting a blockchain, the data deletion program, when executed by a computer, causing the computer to:
  delete unnecessary data included in the blockchain; and
  acquire a lowest block number from the blockchain and store the acquired lowest block number in a storage area when the data is deleted by the deletion unit.

A data storage device according to a fourth aspect of the present disclosure is a data storage device that stores acquired data using a blockchain, and includes:
  at least one of (i) a circuit and (ii) a processor having a memory storing computer program code, wherein
  the at least one of (i) the circuit and (ii) the processor is configured to cause the data storage device to:
    delete unnecessary data from among data included in the blockchain; and acquire a lowest block number of the blockchain and stores the acquired lowest block number in a storage area when the data is deleted by the deletion unit.

According to the present disclosure, it is possible to determine whether deletion of data included in a blockchain is legitimate deletion or unauthorized tampering.

The following will describe an embodiment of the present disclosure with reference to the drawings. The embodiment described below shows an example of the present disclosure, and the present disclosure is not limited to a specific configuration described below. In an implementation of the present disclosure, a specific configuration according to the embodiment may be adopted as appropriate.

FIG. 1 is a functional block diagram showing an electric configuration of a data storage system 10 according to an embodiment. The data storage system 10 includes an in-vehicle ECU (i.e., Electronic Control Unit) 14 included in a vehicle 12 and a backup server 16.

The in-vehicle ECU 14 is one of a plurality of electronic control units mounted on the vehicle 12. The in-vehicle ECU 14 may be, for example, a body system integrated ECU, or an autonomous driving ECU for autonomous driving or advanced driving support. Further, the in-vehicle ECU 14 may be a dedicated ECU for storing acquired data. The in-vehicle ECU 14 is electrically connected, either directly or indirectly, to a DCM (i.e., Data Communication Module) 20, a V2X (i.e., Vehicle to Everything) communication device 22, a plurality of in-vehicle sensors 24, and the like.

The DCM 20 is a communication module that is mounted on the vehicle 12, and that transmits and receives data to and from an information processing device such as the backup server 16. For example, the DCM 20 transmits data stored in the in-vehicle ECU 14 to the backup server 16 for backup, and receives backup data from the backup server 16.

The V2X communication device 22 is an in-vehicle communication device that realizes vehicle-to-vehicle communication, road-to-vehicle communication, pedestrian-to-vehicle communication, and the like. When there exist an in-vehicle unit mounted on another vehicle, a road-side device arranged on a road, a portable terminal carried by a pedestrian, or the like within a communication range, the V2X communication device 22 can bidirectionally communicate with these communication configurations. The V2X communication device 22 transmits communication data acquired through communication to the in-vehicle ECU 14, for example, by way of a communication bus in an in-vehicle communication network or the like.

The in-vehicle sensor 24 is configured to include multiple types of sensors mounted on the vehicle 12. The in-vehicle sensors 24 include a vehicle speed sensor and an inertia sensor that detect a travel state of the vehicle 12, an in-vehicle camera that detects a driver's state and driving operation, a pedal sensor, and a steering sensor. The in-vehicle sensors 24 further include a vehicle-outside camera, a millimeter-wave radar and a lidar for driving support or autonomous driving. Each of the in-vehicle sensors 24 transmits detected data to the in-vehicle ECU 14, for example, via a communication bus of the in-vehicle communication network.

The in-vehicle ECU 14 is an in-vehicle computer that has the function of a data storage device that acquires data generated in the vehicle 12, and stores the acquired data in a tamper-proof state that makes it difficult to tamper the acquired data. The in-vehicle ECU 14 includes a control circuit including a processor 26, a storage 28, an input/output interface (I/O) 30, a RAM (i.e., Random Access Memory) 32, and the like.

The processor 26 is hardware for arithmetic processing, which is coupled with the RAM 32, and the processor 26 is capable of executing various types of programs with performing access processing to the RAM 32. The storage 28 includes a non-volatile storage medium, and stores various types of programs to be executed by the processor 26. The storage 28 stores at least a data deletion program related to data accumulation, data provision, and data monitoring regarding data generated in the vehicle 12.

The in-vehicle ECU 14 defines at least two different processing areas within the system, i.e., a normal world NW and a secure world SW. The normal world NW and the secure world SW may either be physically separated from each other in hardware, or be virtually separated from each other through cooperation of hardware and software. The in-vehicle ECU 14 separates resources required for the execution of applications, into the normal world NW and the secure world SW, by utilizing the functions of context switches and the like, in a time-division manner.

The normal world NW is a normal area for executing an operating system and applications. The normal world NW is provided with a normal storage US, as a storage area (Untrusted Storage) for storing data.

The secure world SW is an area isolated from the normal world NW. In the secure world SW, a secure operating system and applications for processing that is required to have security are executed. Access to the secure world SW from the normal world NW is restricted by a function of the processor 26. Therefore, the existence of the secure world SW cannot be recognized from the normal world NW, and the safety of (a) the processing executed in the secure world SW, (b) the information stored in the secure world SW and the like is ensured. The secure world SW is provided with a secure storage TS, which is a storage area (as Trusted Storage) for storing data, and which cannot be directly accessed from the normal world NW, and an access to which is restricted. The capacity of the secure storage TS may be made smaller than the capacity of the normal storage US.

The in-vehicle ECU 14 of the present embodiment stores the acquired data using a blockchain. Here, as accumulation of data stored by the blockchain progresses, the data size of the blockchain increases, and it becomes difficult to store all the data in the storage area provided in the in-vehicle ECU 14. Therefore, the in-vehicle ECU 14 of the present embodiment deletes part of the data included in the blockchain at an interval of every predetermined period.

In the following description, a configuration regarding blockchain generation and data deletion in the in-vehicle ECU 14 will be described with reference to FIG. 1.

The normal world NW includes a data acquirer 40, a block generator 42, a backup transmitter 44, a data deleter 46, a program hash value calculator 48, a data verifier 50, and a data restorer 52.

The data acquirer 40 is electrically connected to, for example, a communication bus of the in-vehicle communication network, and acquires various data generated in the vehicle 12, such as communication data, detection data, and the like through the communication bus. The data acquirer 40 extracts preset data from the data sequentially output to the communication bus by the in-vehicle sensor 24 and the V2X communication device 22, selectively acquires it as acquired data to be saved, and stores it in a vehicle database 54 provided in the in the normal storage US.

The block generator 42 converts, out of the data acquired and stored by the data acquirer 40, the data to be stored in a blockchain into a hash chain data structure, and stores it in the normal storage US as a secure data file 56. The block generator 42 generates a single block, based on a specified number of data or a specified capacity of data, regarding which the specified number or the specified capacity has been preliminarily determined. The block generator 42 generates a blockchain formed as a linear linkage of a large number of blocks, in which a hash value of data in one block (i.e., block hash value) is included in the next block. The number of the last linked block (i.e., a final block number) and a block hash value (i.e., a final block hash value) of such block are stored in the secure storage TS.

The final block hash value stored in the secure storage TS is a hash value based on a current final block of the blockchain. The final block hash value is a 256-bit value (i.e., a character string) obtained as an output of arithmetic processing in which all data of the final block is input to a hash function.

The final block number is a unique value assigned to the final block, and is a value indicating what block number the current final block has in the blockchain, when the block number of an initial block is 0. The final block number is also a value that indicates the number of blocks currently linked to the blockchain. The block generator 42 updates the final block hash value and the final block number stored in the secure storage TS every time it generates a new block and calculates its hash value.

Figure 2:
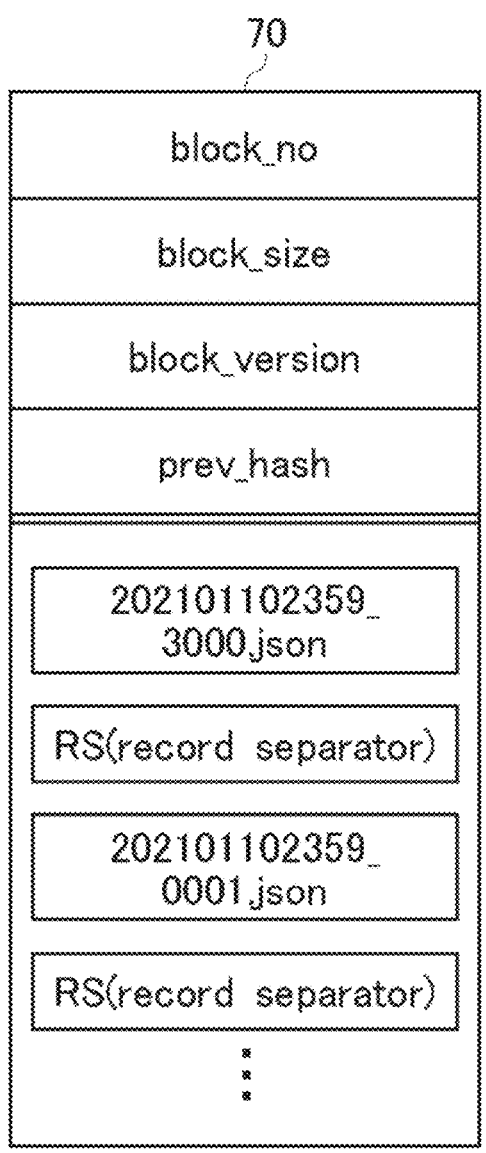
FIG. 2 is a schematic diagram showing a configuration of blocks and a block table according to the embodiment.
Figure 2:
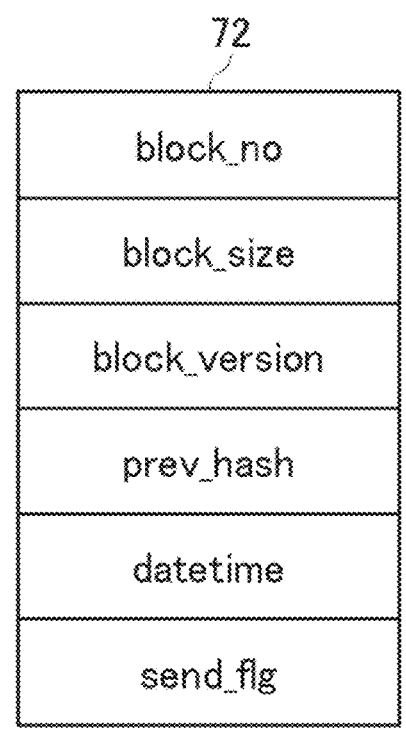

FIG. 2 is an example of a block 70 generated by the block generator 42 and stored as the secure data file 56 and a block table 72 stored in the blockchain database 58. The block 70 and the block table 72 are associated by block numbers.

The block 70 includes data (202101102359_3000.json, 202101102359_0001.json) that is considered as one block 70 along with the block number (block_no), a data size of the block (block_size), a version of a program used to generate the block (block_version), and a hash value of a previous block (prev_hash).

The block table 72 includes the block number (block_no), the data size of the block (block_size), a block generation version (block_version), and the hash value of the previous block 70 (prev_hash). These values are the same as the block 70 with the same block number. Further, the block table 72 includes date and time when the block 70 was generated (datetime), and flag information (send_flag) indicating whether the data whose hash value is stored in the block 70 has been sent to the backup server 16. The flag information is indicated by 0 or 1, for example. The flag information of 0 indicates that the data has not been sent to the backup server 16, and the flag information of 1 indicates that the data has been sent to the backup server 16.

When a new block 70 is generated by the block generator 42, the backup transmitter 44 transmits data in which the hash value is stored in the block 70 to the backup server 16 via the DCM 20 for backup. The backup server 16 associates the data transmitted by the backup transmitter 44 with, for example, ID information of the in-vehicle ECU 14, and stores the data in a large-capacity storage medium such as a hard disk drive or the like.

The data deleter 46 deletes unnecessary data from among the data (i.e., block 70) included in the blockchain. The data deleted by the data deleter 46 is data that satisfies a predetermined condition. The data that satisfies such predetermined condition is, for example, data that has already been uploaded to the backup server 16 and that is a predetermined period of time before a current time. The predetermined period is, for example, one week before the current date. That is, data from one week ago is data with low freshness that is unlikely to be used for controlling the vehicle 12, and is data that is deletable from the vehicle 12 without any inconvenience. Target data to be deleted is determined based on the datetime and send_flg of the block table 72. Further, the data deleter 46 deletes data at a predetermined time, for example once a day. Note that the conditions for data to be deleted are not limited to the above, that is, for example, data may be deleted when the data size of the blockchain is equal to or exceeds a certain size, and when such condition is met, the data deleter 46 is configured to delete data included in the blockchain having a size that is equal to or greater than the certain size.

The program hash value calculator 48 calculates a first unique value that is a unique value of a program (hereinafter referred to as "data deletion program") that functions as the data deleter 46 when the data deleter 46 has delete data. Note that such unique value is, for example, a hash value, and, in the following description, the first unique value will be referred to as a calculated program hash value.

The data verifier 50 provides a function that verifies integrity of the blockchain, which re-calculates the final block hash value of the blockchain, and determines abnormality of data based on matching between the re-calculated final block hash value and the final block hash value stored in the secure storage TS. When the re-calculated final block hash value matches the stored final block hash value, the data verifier 50 determines that there is no abnormality such as tampering, deficit or the like in the data. On the other hand, when the re-calculated final block hash value does not match the stored final block hash value, it is determined that there is a possibility of an abnormality such as tampering with the data or the like.

Further, as will be described later, the data verifier 50 of the present embodiment determines whether a lowest block number stored in the secure storage TS matches the lowest block number in the blockchain from which data has been deleted by the data deleter 46.

The data restorer 52 restores data using backup data stored in the backup server 16 when the data verifier 50 determines that there is an abnormality such as tampering, deficit or the like.

The secure world SW includes a program hash value determiner 60 and a lowest block number storage processor 62.

The program hash value determiner 60 determines whether the calculated program hash value calculated by the program hash value calculator 48 matches a stored program hash value, which is a hash value of the data deletion program calculated and stored in advance. When the calculated program hash value and the stored program hash value are different, the program hash value determiner 60 determines that there is a possibility that the data deletion program has been tampered with. Note that the stored program hash value is stored in the secure storage TS to prevent tampering.

When data is deleted by the data deleter 46, the lowest block number storage processor 62 acquires the lowest block number from the blockchain, and stores it in the storage area. Specifically, by deleting data from the blockchain, the lowest block number of the block 70 that constitutes the blockchain increases. For example, when a blockchain stored in the in-vehicle ECU 14 is constituted by 20 blocks 70, and data has not been deleted therefrom, the lowest block number before data deletion is 0. When blocks 70 with block numbers from 0 to 10 are deleted due to data deletion, the lowest block number of the blockchain becomes 11, and the value of such block number is acquired by the lowest block number storage processor 62. Note that the lowest block number is stored in the secure storage TS to prevent tampering.

Figure 3:
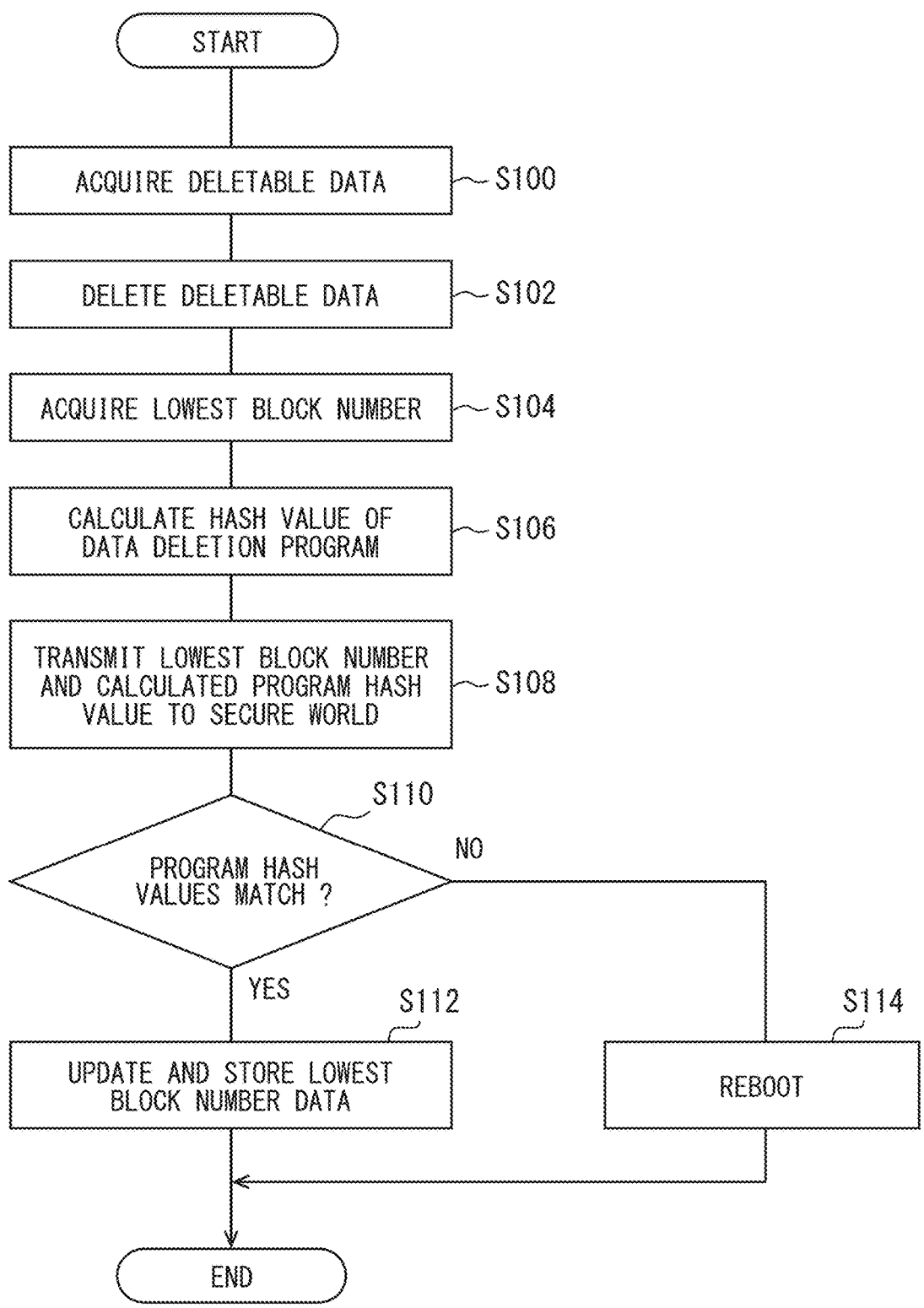
FIG. 3 is a flowchart showing a flow of data deletion processing according to the embodiment.

FIG. 3 is a flowchart showing a flow of data deletion processing according to the present embodiment. The data deletion processing is performed, for example, once a day at a predetermined time.

First, in step S100, the data deleter 46 acquires deletable data from the blockchain. The deletable data in the present embodiment is data that has already been uploaded to the backup server 16 and that is a predetermined period of time (for example, one week) before the current time. Specifically, the data deleter 46 sorts blocks 70 whose flag information (send_flg) included in the block table 72 is 1 by generation date and time (datetime), and acquires, as deletable data, data that is included in the blocks 70 that were generated at least one week before the current day.

Subsequently in step S102, the data deleter 46 deletes the data acquired as deletable data. Deletion of data here refers to (a) deletion, from the secure data file 56, of a block 70 (*i*) contained in the secure data file 56 and (ii) containing deletable data or (b) deletion, from the blockchain database 58, of the block table 72 corresponding to such block 70. By deleting such data, data that is no longer necessary for the in-vehicle ECU 14 is deleted from the blockchain, and a new storage area for storing the data is secured.

Subsequently in step S104, the data deleter 46 acquires the lowest block number in the blockchain after data deletion.

Subsequently in step S106, the program hash value calculator 48 calculates a hash value (calculated program hash value) of the data deletion program.

Subsequently in step S108, the lowest block number and the calculated program hash value are transmitted to the secure world SW.

Subsequently in step S110, the program hash value determiner 60 determines whether the calculated program hash value and the stored program hash value stored in the secure storage TS match, and in case of having an affirmative determination, the process proceeds to step S112, and in case of having a negative determination, the process proceeds to step S114.

In step S112, the lowest block number storage processor 62 updates the lowest block number stored in the secure storage TS to the new lowest block number transmitted from the normal world NW and stores it.

When the calculated program hash value and the stored program hash value do not match in step S110, there is a possibility that the data deletion program has been tampered with, damaged or the like. Therefore, in step S114, the in-vehicle ECU 14 is rebooted. Further, after rebooting, the data restorer 52 acquires the deleted data from the backup server 16, and the block generator 42 re-generates the blockchain including the data acquired from the backup server 16.

As described with reference to FIG. 3, the in-vehicle ECU 14 of the present embodiment is configured to delete some of the data contained in the blockchain because the data size of the blockchain increases as the accumulation of data stored in the blockchain progresses. When the in-vehicle ECU 14 deletes data included in the blockchain, the in-vehicle ECU 14 acquires the lowest block number included in the blockchain, updates it in the secure world SW, and stores it therein. Therefore, when the data deletion is legitimate, the stored lowest block number will be updated, but when the data deletion is unauthorized tampering of the data, the stored lowest block number will not be updated.

Thereby, the in-vehicle ECU 14 of the present embodiment can determine whether deletion of data included in the blockchain is legitimate deletion or unauthorized tampering.

Figure 4:
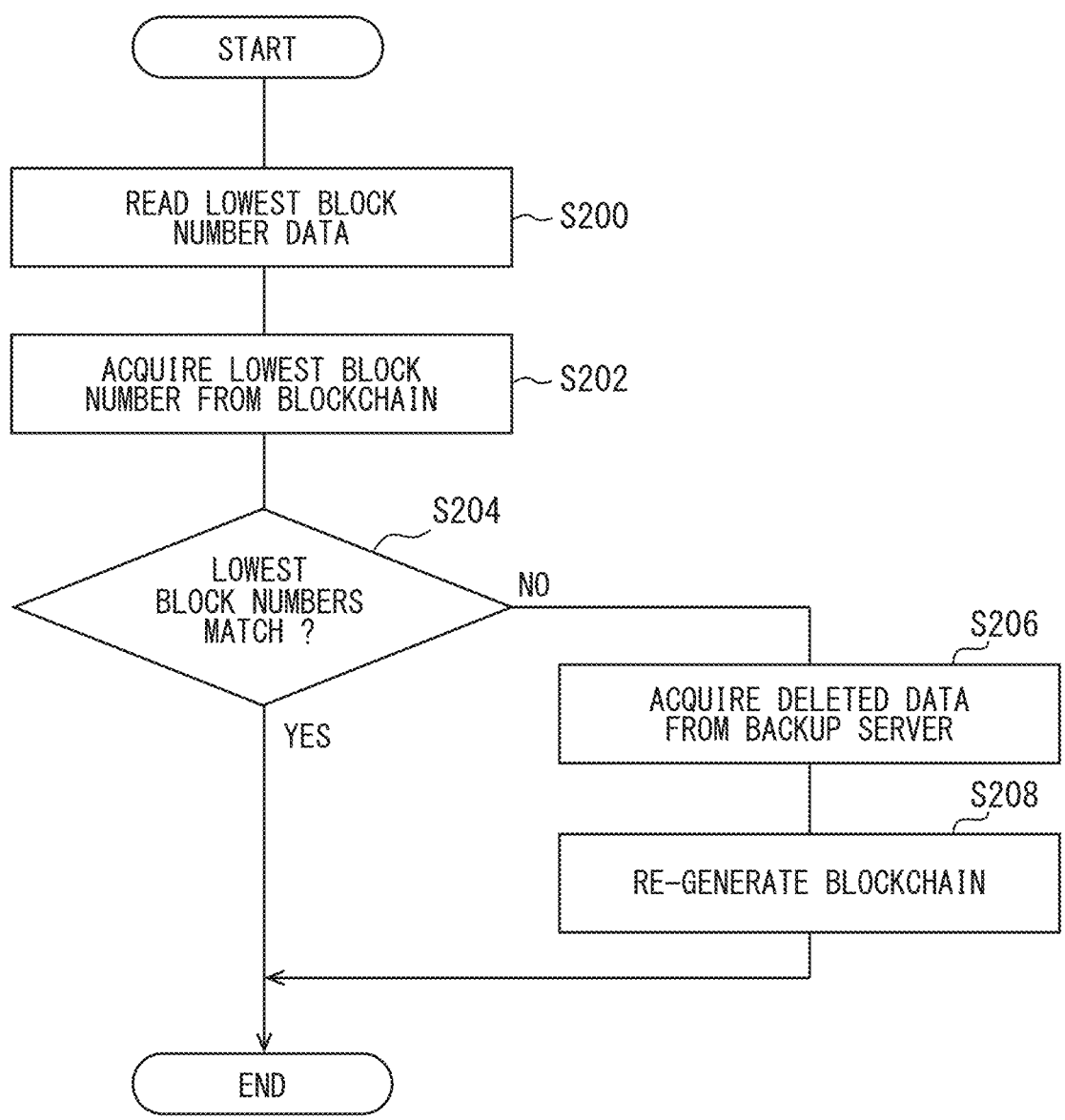
FIG. 4 is a flowchart showing a flow of lowest block number verification processing according to the embodiment.

FIG. 4 is a flowchart showing a flow of lowest block number verification processing in the present embodiment. The lowest block number verification processing is performed, for example, once a day at a predetermined time.

First, in step S200, the lowest block number stored in the secure storage TS is acquired.

Subsequently in step S202, the data verifier 50 acquires the lowest block number from the blockchain.

Subsequently in step S204, the data verifier 50 determines whether the lowest block number stored in the secure storage TS matches the lowest block number in the blockchain, and when an affirmative determination is made, it is determined that there has been no tampering, and ends the lowest block number verification processing. On the other hand, when they do not match, it is determined that the data deletion is tampering, and the process proceeds to step S206.

In step S206, the data restorer 52 acquires data included in the block 70 that is determined as unmatching from the backup server 16. Specifically, since data verification of a block number between the lowest block number stored in the secure storage TS and the lowest block number in the blockchain indicates that relevant data has been deleted by tampering, such data is acquired from the backup server 16.

Subsequently in step S208, the block generator 42 re-generates the blockchain including the acquired data, and ends the lowest block number verification processing.

In such manner, the lowest block number verification processing compares the lowest block number stored in the secure storage TS with the lowest block number in the blockchain, and when they match, it is determined that the data has been deleted legitimately. On the other hand, when they do not match, it is determined that the data was erased due to unauthorized tampering. Thereby, the lowest block number verification processing can determine whether the deletion of data included in the blockchain is legitimate deletion or unauthorized tampering.

Although the present disclosure is described with the embodiment as described above, the technical scope of the present disclosure is not limited to the scope described in the embodiment described above. Various changes or improvements can be made to the above-described embodiment without departing from the spirit of the present disclosure, and other modifications or improvements are also encompassed in the technical scope of the present disclosure.

In the embodiment described above, a mode has been described in which the normal world NW and the secure world SW are defined for the in-vehicle ECU 14, but the present invention is not limited to such scheme, and the secure world SW may be not defined in the in-vehicle ECU 14. In such case, the lowest block number of the blockchain, the stored program hash value, and the like are stored in the storage area of the normal world NW. Further, when the in-vehicle ECU 14 does not have the secure storage TS, in-vehicle ECU 14 may have a storage similar to the secure storage TS, such as a storage that is not directly accessible from the normal world NW, a storage that has a restricted access, or the like.

Data which can be stored by the data storage device is not limited to text data. Depending on the capacity of the normal storage US, it may be possible to store, for example, audio data, image data, video data, and the like. Further, the data stored in individual blocks 70 of the blockchain may also be changed accordingly.

The hash function used in the in-vehicle ECU 14 of the above embodiment is a cryptographic hash function. Such a cryptographic hash function has characteristics such that (a) the cryptographic hash function does not output the same hash value in response to different inputs, and (b) it is substantially impossible to estimate the input from a hash value output therefrom. Instead of the above-mentioned SHA-256, which is one of the SHA-2 algorithms, SHA-1, SHA-2, or SHA-3 algorithms may be used as appropriate depending on the required output length (i.e, the number of bits). Alternatively, an irreversible value that serves as a unique value of data or a program may be used instead of using a hash value. Further, an irreversible unique value calculated from data may be used instead of using a hash value. A unique value that can be used instead of a hash value is, for example, a discrete cosine transform (DCT) or the like.

The vehicle 12 having the in-vehicle ECU 14 installed thereon may be a vehicle which is individually owned by an owner, and is an owner vehicle expected to be used by such an owner or the like. By applying the present disclosure to such an owner vehicle, data indicating user's driving history, which is accumulated in a tamper-proof state of being protected from tampering, is highly valuable for service providers who determine insurance fees according to driving conditions, for example.

The vehicle 12 having the in-vehicle ECU 14 installed thereon may also be a vehicle as a rental car, a vehicle of a manned taxi, a vehicle for ride sharing, a freight vehicle, a bus, or the like. The in-vehicle ECU 14 may also be installed in a driver-less vehicle for use in mobility services. As mobility services expand in the future, it is assumed that the importance of data accumulated in the in-vehicle ECU 14 will further be increased.

In the above-described embodiment, the respective functions provided by the in-vehicle ECU 14 can be also provided by software and hardware for executing the software, only by software, only by hardware, and complex combinations of software and hardware. When these functions are provided by electronic circuits as hardware, each of the functions can also be provided by digital circuits that include a large number of logic circuits, or by analog circuits.

Each processor in the above-described embodiment may include at least one arithmetic core such as a central processing unit (CPU), a graphics processing unit (GPU) or the like. The processor may further include a field-programmable gate array (FPGA) and an IP core having other dedicated functions.

It is possible to change, as required, a configuration of a storage medium for storing the respective programs relating to the data storage method according to the present disclosure, which is adopted as a storage according to the above-described embodiment. For example, the storage medium is not limited to the configuration provided on a circuit board, and may also be provided in the form of a memory card or the like, which may be inserted into a slot, and electrically connected to a bus of a computer. The storage medium may include an optical disk, a hard disk drive, or the like, which forms a source of programs to be copied into a computer.

The control unit and the method thereof described in the present embodiment may be implemented by a dedicated computer implementing a processor programmed to execute one or multiple functions embodied by a computer program. Alternatively, the device and the method thereof described in the present embodiment may also be implemented by a dedicated hardware logic circuit. Alternatively, the device and the method thereof described in the present embodiment may be implemented by one or more dedicated computers configured by a combination of (a) a processor executing a computer program and (b) one or more hardware logic circuits. The computer program may also be stored in a computer-readable and non-transitory, tangible storage medium as instructions to be executed by a computer.

Further, an ECU equipped with the function of a data storage device can be installed in a moving object other than a vehicle. For example, an ECU having the function of a data storage device can be installed in (a) heavy machinery operated at a work site, (b) driving play ride arranged at an amusement facility, (c) a railway vehicle, (d) a tram, E an aircraft, and the like.

Further, a flow of processing described in the above embodiment is only an example, and unnecessary steps may be deletable therefrom, new steps may be addable thereto, or the processing order may be changed without departing from the scope of the present disclosure.

What is claimed is:

1. A data storage device that stores acquired data using a blockchain, the data storage device comprising:
   a deletion unit that is configured to delete unnecessary data from among data included in the blockchain; and
   a lowest number storage processing unit that is configured to acquire a lowest block number of the blockchain and store the acquired lowest block number in a storage area when the data is deleted by the deletion unit.

2. The data storage device of claim 1, wherein
   a storage area is defined as a restricted storage area to which access is restricted, and
   the lowest block number is stored in the restricted storage area.

3. The data storage device of claim 1, wherein
   the data deleted by the deletion unit is data that has been uploaded to a backup server and was generated before a predetermined period or earlier from a current time.

4. The data storage device of claim 1, further comprising:
   a data verification unit that is configured to determine whether the lowest block number stored by the lowest number storage processing unit matches the lowest block number in the blockchain.

5. The data storage device of claim 4, wherein
   the data to be deleted by the deletion unit has already been uploaded to a backup server, and
   when the lowest block number stored by the lowest number storage processing unit does not match the lowest block number in the blockchain, the data is obtained from the backup server and the blockchain is regenerated.

6. The data storage device of claim 1, further comprising:
   a unique value calculation unit that is configured to calculate a first unique value that is a value unique to a program serving as the deletion unit when the deletion unit deletes the data; and
   a unique value determination unit that is configured to determine whether the first unique value calculated by the unique value calculation unit matches a second unique value that is a value unique to the program and has been calculated and stored in advance.

7. The data storage device of claim 6, wherein
   a storage area is defined as a restricted storage area to which access is restricted, and
   the second unique value is stored in the restricted storage area.

8. A mobile object, comprising
   the data storage device of claim 1.

9. A non-transitory, computer readable, storage medium storing a data storage program for deleting data constituting a blockchain, the data storage program, when executed by a computer, causing the computer to:
  delete unnecessary data from among the data included in the blockchain, and
  acquire a lowest block number of the blockchain and store the acquired lowest block number in a storage area when the data is deleted.

10. A data storage device that stores acquired data using a blockchain, the data storage device comprising:
  at least one of (i) a circuit and (ii) a processor having a memory storing computer program code, wherein
  the at least one of (i) the circuit and (ii) the processor is configured to cause the data storage device to:
  delete unnecessary data from among data included in the blockchain; and
  acquire a lowest block number of the blockchain and store the acquired lowest block number in a storage area when the data is deleted.

* * * * *